United States Patent
Joklik et al.

[11] 3,901,659
[45] Aug. 26, 1975

[54] REACTOR FOR CARRYING OUT CATALYTIC REACTIONS WITH SOLID BED CATALYSTS

[75] Inventors: Otto Joklik, Vienna, Austria; Gunter Elebracht; Gunter Siekmann, both of Brackwede, Germany

[73] Assignee: Rheinstahl AG, Germany

[22] Filed: Apr. 16, 1973

[21] Appl. No.: 351,584

[30] Foreign Application Priority Data
Mar. 7, 1972 Austria .............................. 1867/72
May 3, 1972 Austria .............................. 3819/72

[52] U.S. Cl. ........... 23/288 K; 23/288 A; 23/288 H; 165/107; 165/158; 165/159
[51] Int. Cl.$^2$............................................ B01J 8/06
[58] Field of Search.......... 23/288 K, 288 L, 288 M; 165/158, 159, 107

[56] References Cited
UNITED STATES PATENTS

| | | | |
|---|---|---|---|
| 2,852,564 | 9/1958 | Warner et al. | 23/288 M |
| 2,986,454 | 5/1961 | Jewett | 23/288 K X |
| 3,285,713 | 11/1966 | Pochler et al. | 23/288 M X |
| 3,434,807 | 3/1969 | Ibing et al. | 165/159 X |
| 3,792,980 | 2/1974 | Vollmer et al. | 165/158 X |

*Primary Examiner*—James H. Tayman, Jr.
*Attorney, Agent, or Firm*—McGlew and Tuttle

[57] ABSTRACT

A reactor for carrying out catalytic reactions with solid bed catalysts comprises a reaction vessel and a cooler. The reaction vessel comprises a reaction part included space tube plates with contact tubes mounted between the plates and seated in the plates so that they are exposed on the exterior of said plates to a gas inlet chamber on one end and a gas outlet chamber on the opposite end. The cooler comprises a drum body with a water space and a steam space and it includes cooling tubes mounted therein which are connected for circulation of a cooling liquid from the cooler to the reactor and for the return thereof for re-cooling. The reaction vessel and the cooler are connected by piping which permits their separation from each other. The reaction vessel includes at least one tubing unit having an inlet and an outlet and with a distributor connected to the respective inlet and outlet, which has a horizontal passage flow for the heat exchange fluid which enters and leaves the reactor. The reactor includes baffling means for permitting back and forth flow of the coolant over the exteriors of the tubes in the reactor from the inlet to the outlet. In one form of reactor construction, the reactor vessel includes an intermediate cylindrical wall which is connected between the tube sheets and which includes an annular flow passage defined over the respective inlet and outlet openings. The outer cylindrical jacket itself may be formed with an outwardly extending upper and lower portion to define the annular flow spaces for the inlet and outlet of the coolant. Similar constructions may be used for more than one tube unit. An alternate inlet arrangement and outlet arrangement is a construction in which a conduit for the inflow of the coolant extends downwardly from the end of the vessel directly through the adjacent tube sheet into the coolant flow area between the tube sheets and around the tubes. Similarly, the outlet connection extends from the lower portion of the space surrounding the tubes between the tube sheets outwardly through the lowermost tube sheet and then horizontally through the gas chamber at the lower end of the vessel.

1 Claim, 5 Drawing Figures

REACTOR FOR CARRYING OUT CATALYTIC REACTIONS WITH SOLID BED CATALYSTS

BACKGROUND OF THE INVENTION

1. FIELD OF THE INVENTION

This invention relates in general to the construction of reactors and reactor systems and, in particular, to a new and useful reactor for carrying out catalytic reactions with solid bed catalysts which comprises a reaction vessel and a cooler and wherein the reaction vessel comprises a reaction part with contact tubes mounted between tube plates and a gas inlet chamber and a gas outlet chamber, and the cooler comprises a drum body with a water and steam space, and means for circulating the coolant through tubes submerged in the water space and for returning it to the reactor.

2. DESCRIPTION OF THE PRIOR ART

For carrying out catalytic gas phase reactions over fixed contact masses (solid bed catalysts), there are known cylindrical reaction apparatus in a vertical arrangement in which the reaction gas is conducted, within the tube furnace, through contact tubes containing the fixed catalytic bed, and wherein an appropriate coolant, for example fused salt, is circulated by circulation devices mounted either within the reactor or on the outside thereof.

A reactor is known which includes an expensive immersion device mounted in its central portion and with a salt bath stirrer and a salt bath cooler serving to utilize the excess of heat of reaction to be eliminated. Another known device includes a salt bath cooler mounted above the reactor. In both of the known reactors, the salt bath flows in parallel direction to the contact tubes. Another disadvantage of the known devices is that the immersion equipment occupies a space which could be used for further contact tubes and, due to the immersion device and the salt bath cooler, the reactor becomes heavy and complicated.

These disadvantages have been partly avoided by another known construction in which the circulation device for the salt bath and the salt bath cooler are not placed in the reactor center, but are secured directly to the reactor itself (cf. P. Ellwood, Chem. En. June 2, 1969, pages 80 ff.). In this case too, there is a parallel flow of the salt bath.

All of the known reactors show a common drawback in that the stirrer for the salt bath, as well as the salt bath cooler, are secured directly to the reactor or immediately connected thereto and that the salt bath is circulated parallel to the contact tubes. A further disadvantage is due to the direct coupling of the reactor with the motor driven salt bath stirrer. Vibrations are transferred to the reactor itself, or to the contact mass in the tubes, and consequently, the contact mass fixed to a carrier which is not sufficiently resistant, disintegrates to powder in a relatively short time, and the contact tubes become choked and the contact mass must be changed prematurely. Moreover, in processes in which a very high heat of reaction is generated and therefore a great quantity of heat is to be eliminated, the circulation of the salt bath in a direction parallel to the contact tubes is frequently insufficient. Another drawback is the necessity to provide a free space above the reactor, in order to be able to mount and remove the stirrer and the salt bath cooler.

The most serious disadvantage of the known reactors with a centrally mounted stirrer for the salt bath and a salt bath cooler, however, is the fact that, for a given diameter of the reactor, the number of contact tubes having a determined nominal diameter is considerably reduced. This unfavorably effects the capacity of the reactor. The diameter of the reactor is limited, for example, by the passage clearances allowed in the railroad or road traffic regulations.

SUMMARY OF THE INVENTION

The invention is based in part on the realization that in order to eliminate the excess of heat reaction which is not always constant, the respective effective cooling surface in a cooler should be made variable, while assuring at the same time, a small size of the cooler and a simple construction of the reactor vessel, and that no vibrations are to be transferred to the mass fixed in the contact tubes. The cooler should be as small as possible and produce an optimal cooling effect.

In accordance with the present invention, this problem is solved so that the reaction vessel and the cooler are connected to each other only by a piping but otherwise are mounted independently of each other at any desired spacing, and the reaction vessel is composed of one or several tubing units, with each tubing unit being provided with an inlet and an outlet conduit comprising a distributor with horizontal passages for the heat exchange fluid, and in the zone of the contact tubes, several annular and disc-shaped baffles are mounted in alternate arrangement.

Because the heat exchange fluid flows in and out through a distributor with horizontal passages, and its flow therebetween is guided by the annular and disc-shaped baffles, an optimal cooling effect is obtained, the fluid moving perpendicularly to the longitudinal axes of the contact tubes.

In order to obtain a uniform flow of the heat exchange fluid from the periphery of the reactor jacket to the interior, the inlet and outlet conduits are formed each by an inwardly open annular U-section which is tightly connected to the tubing unit in the upper and lower end portions thereof, respectively. An inlet socket is secured to the lower U-section conduit and an outlet socket to the upper U-section conduit. In the zone of each U-section, several openings distributed along the circumference are provided in the jacket of each tubing unit.

Instead of U-sections, there may also be provided annular pipes, both at the upper and lower end portions of each tubing unit, the pipes being connected to the unit through short radial tube pieces.

According to a further development of the invention, the inlet and the outlet conduits of the heat exchange fluid are formed in each case by an annular widening molded in the lower and upper end portions of the jacket of each tubing unit, with an inlet socket provided in the lower portion and an outlet socket provided in the upper portion.

In the zone of each annular widening, the jacket of the tubing unit, i.e., the cylindrical wall of non-widened diameter, may be extended up and down, respectively, to the close proximity of the tube plates. Teeth or cutouts are provided in these extensions.

To make the supply and outflow of the heat exchange fluid more effective, the invention provides that the horizontal openings, through which the distributor communicates with the interior of the tubing unit, have cross-section areas increasing from the inlet and outlet sides along the circumference up to the opposite side of the unit.

According to a further advantageous embodiment of the invention, both the inlet and outlet conduits of the heat exchange fluid are pipes extending through the center of each tube plate and fixed tightly thereto. The end portion of each of these pipes extend to the first disc-shaped baffle, and the walls of these end portions, between the tube plate and the baffle, are provided with openings distributed over the whole circumference.

Insofar as constructional or other reasons will argue therefor, the inlet and outlet conduits of different shape described above may be mutually combined.

In order to remove the heat exchange fluid in the opposite flow direction through the inlet socket, in the case of an emergency service interruption, the invention provides a connection piece in the fluid outlet which is adapted to be closed, and through which an inert gas under pressure may be fed in. A premature solidification of the fused salt bath during the removal is thereby avoided.

Accordingly, it is an object of the invention to provide an improved reactor construction for carrying out catalytic reactions with solid bed catalysts which comprises a reaction vessel and a cooler which are arranged in spaced relationship, and wherein the reaction vessel comprises a reaction part with contact tubes mounted between two plates which are exposed at their outer ends to a gas inlet chamber and a gas outlet chamber, respectively, and wherein the cooler comprises a drum body with a water and steam space therein and with cooling pipes mounted within the body for the conduction of the coolant liquid from the reactor thereto and backwardly to the reactor.

A further object of the invention is to provide a reactor which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
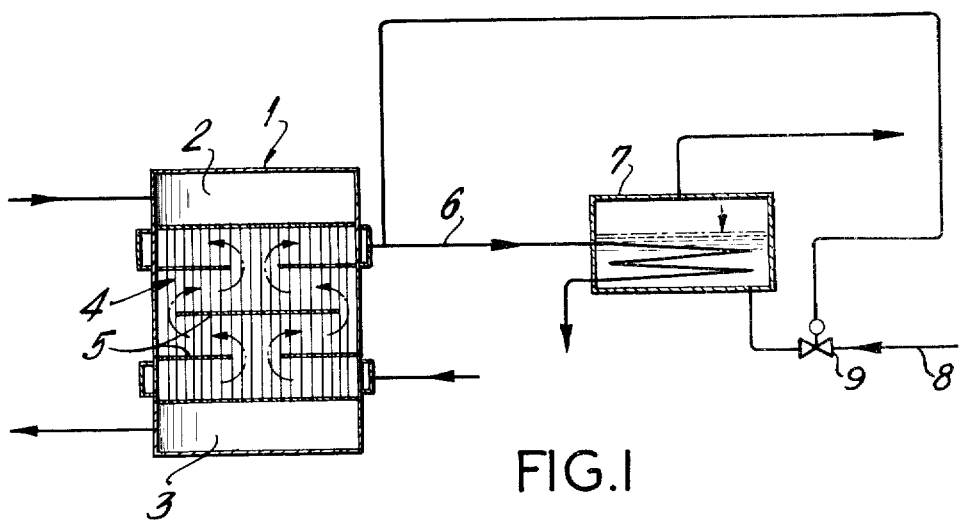
FIG. 1 is a schematic representation of a reactor constructed in accordance with the invention.

Referring to the drawings in particular, the invention embodied therein, according to FIG. 1, comprises a reactor which includes a reaction vessel 1 and a salt bath cooler 7 having a cooling coil 10 through wich a fused salt flows. The reaction vessel 1 comprises a gas inlet chamber 2, a gas outlet chamber 3, and a tubing unit 4. In the tubing unit 4, there are wall and baffle means in the form of several disc-shaped and annular baffles 5 which are mounted in alternate arrangement one above the other, and these baffles effect a coolant flow transversely to the axis of the reactor vessel. Through connecting pipe 6, the outlet of the reaction vessel is connected to the salt bath cooler 7 which is installed at a distance such that the vibrations of the circulation device cannot be transferred to the reaction vessel. The heat exchange fluid cooled in the salt bath cooler is supplied to the inlet of the reaction vessel from a fusing tank comprising a circulation device, both known in themselves, and not represented. The cooler fluid is supplied to the cooler through inlet 8 having a valve 9.

Figure 2:
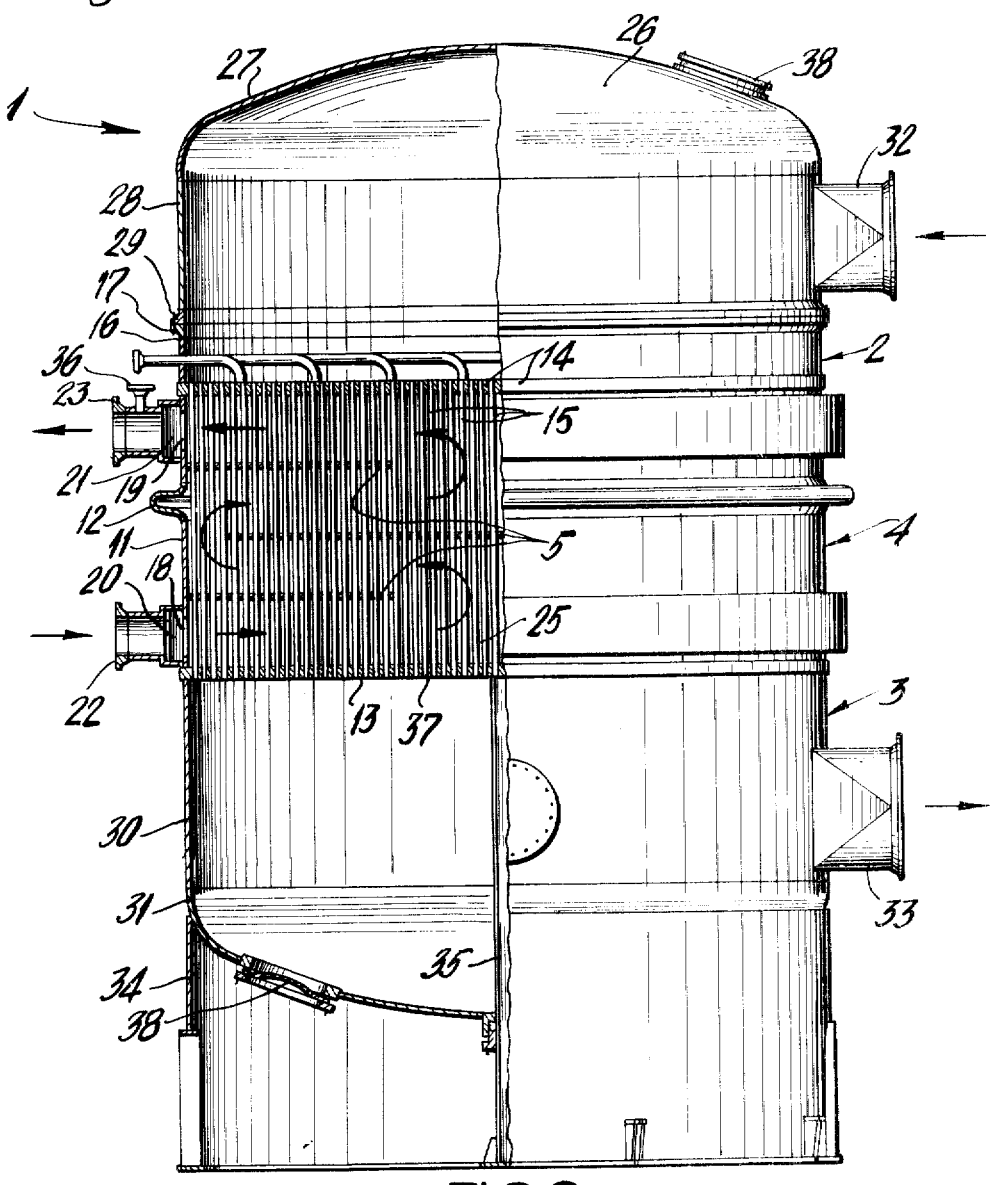
FIG. 2 is a vertical sectional view, partly in elevation, of the reactor employed in the diagrammatic showing of FIG. 1.
Figure 5:
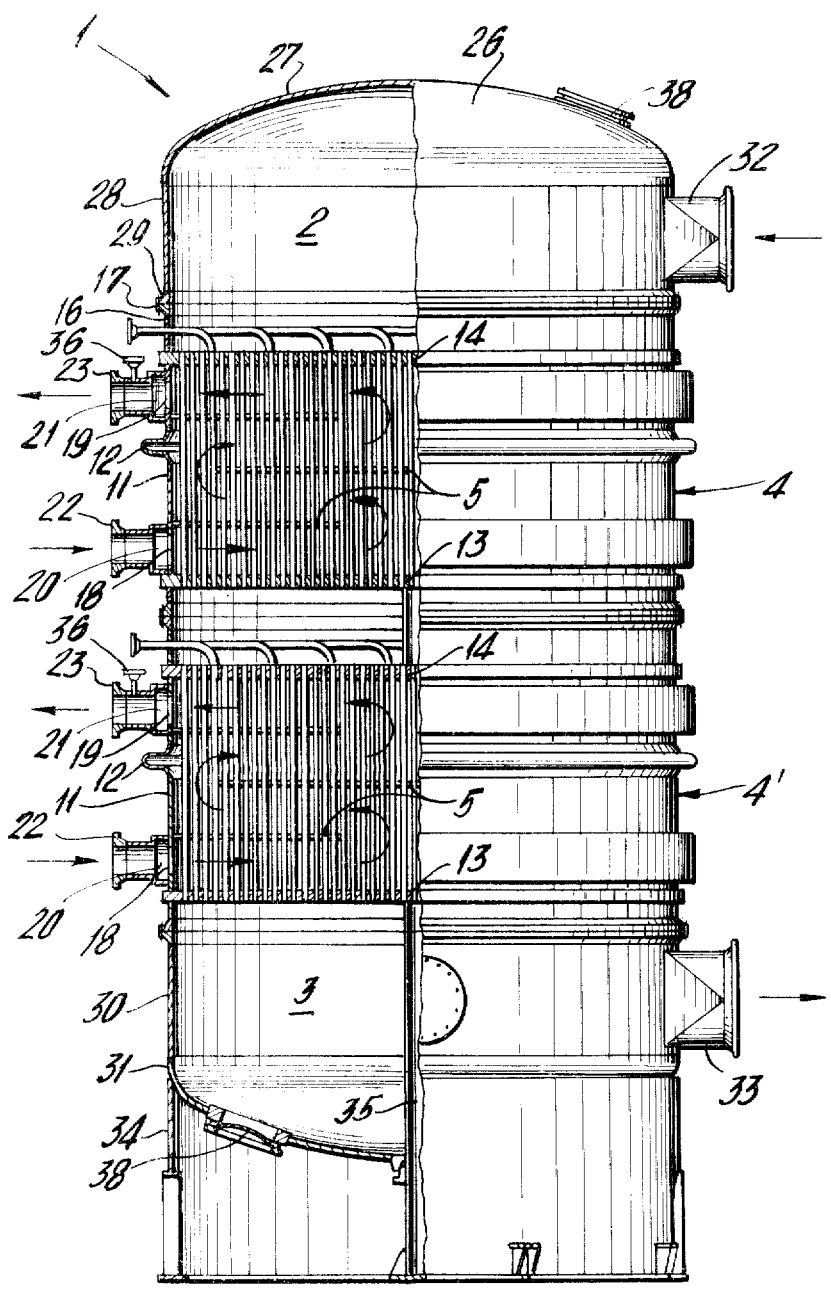
FIG. 5 is a view similar to FIG. 2 of still another embodiment of the invention.

A first embodiment of a reaction vessel, according to the invention, is represented in FIGS. 2 and 5. In FIG. 2, the reaction part comprises only one, and in FIG. 5, two tubing units 4. Each tubing unit 4 comprises a cylindrical jacket 11 with an expansion compensator 12 for the compensating of thermal expansion, a lower tube plate 13 and an upper tube plate 14 both of which are tightly connected to the front sides of jacket 11, and contact tubes 15 having catalyst particles packed therein, whose ends are fixed in the two tube plates 13 and 14 and whose interiors communicate with the gas inlet and outlet chambers at respective ends.

A cylindrical jacket part 16 is mounted on the upper tube plate 14 so that all of the upper ends of the contact tubes are located within the inner cross-sectional area of the jacket. A flange 17 is provided on the free end of the cylindrical jacket part 16. Above the lower tube plate 13, jacket 11 is provided with inlet openings 18, and below the upper tube plate 14, with outlet openings 19. In the zone of the inlet and outlet openings 18 and 19, an inwardly open annular U-section 20 and 21, respectively, is tightly connected to the jacket 11. A connection socket 22 forming the inlet for the heat exchange fluid is welded to the lower U-section 20, and a connection socket 23, forming the outlet for the fluid, is welded to the upper U-section 21.

Baffles 5 are arranged above the openings 18 and below the openings 19 provided in the jacket, and are supported by anchors 25. The baffles 5 include alternately arranged vertically spaced ring- and disc-shaped plates. The annular baffle plates bear with their outer circumference against the inner circumference of jacket 11. The disc-shaped baffle plates leave a free passage between their outer circumferences and the inner circumference of jacket 11.

A cap 26, consisting of a vaulted top 27, a cylindrical jacket portion 28 welded thereto, and a flange 29 welded to the free end of the cylindrical jacket portion, is screwed by its flange 29 to the flange 17 of the cylindrical jacket part 16 mounted above the upper tube plate 14, and form together with the part 16, the gas inlet chamber 2. The gas outlet chamber 3 comprises a cylindrical jacket portion 30 which is welded to a vaulted bottom 31 and tightly connected to the lower tube plate 13. An inwardly flared inlet socket 32 and a similarly shaped outlet socket 33 are welded to the gas inlet chamber 2 and the gas outlet chamber 3, respectively.

The reaction vessel 1 is supported by a bottom frame or cylinder 34 welded to the gas outlet chamber 3. To absorb the load acting on the lower tube plate 13, this plate is supported by a central leg 35. In order to be able, in the case of a service interruption, to accelerate the discharge of the heat exchange fluid in the direction opposite to the flow, i.e., through the inlet socket, a connection piece 36, which can be closed, is provided in the upper fluid inlet and inert gas pressure may be supplied through this connection piece. On their lower ends, the contact tubes 15 are provided with an appropriate closing 37. Rupture discs 38 are provided in the gas inlet and the gas outlet chambers 2 and 3.

The above-described reaction vessel 1 is suited for all kinds of gas phase reactions over fixed contact masses, for example, for the catalytic gas phase oxidation of naphthalene or o-xylene to phthalic anhydride, for the preparation of maleic anhydride from benzine, for the preparation of acrylonitrile, formaldehyde, etc. The baffles 5, arranged in the tubing unit 4, permit radial flow of the fused salt in the jacket space and, therefore, flow transversely to the contact tubes 15.

Instead of the inwardly open annular U-sections 20 and 21, it is also possible to provide for the heat exchange fluid pipes mounted on the circumference of the tubing unit 4 and connected to the openings 18 and 19 of jacket 11 by short tube pieces.

Plane bottoms may also be provided instead of the vaulted bottoms 27 and 31.

Figure 3:
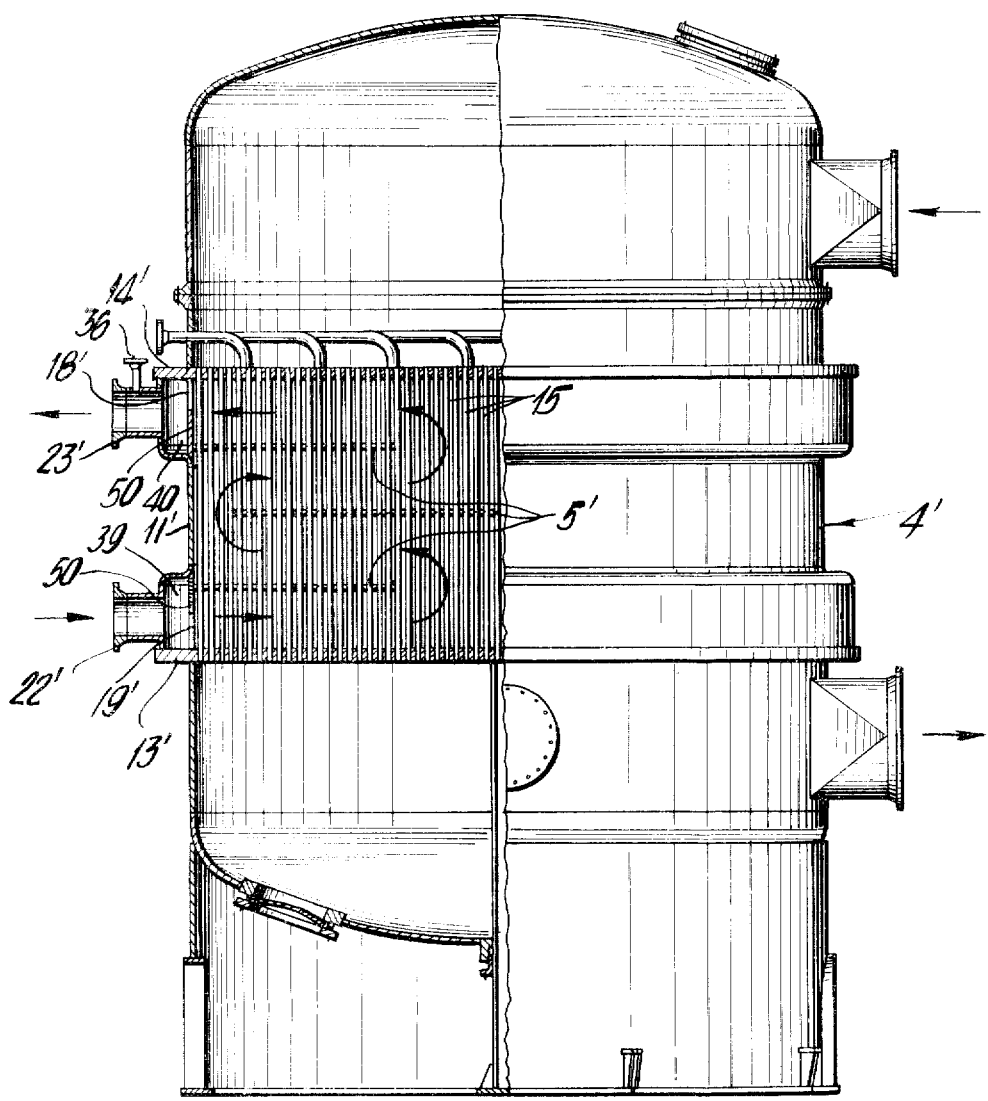
FIG. 3 is a view similar to FIG. 2 of another embodiment of the invention.

The reaction vessel represented in FIG. 3 differs from the vessel according to FIG. 2 in that the openings 18' and 19' and the U-sections forming the inlet and outlet conduits for the heat exchange fluid, or the annular pipes with the tube pieces, are omitted. To form the inlet and outlet conduits, jacket 11' is widened so as to form an S-shaped cross-section portion in the parts above the lower tube plate 13' and below the upper tube plate 14', and thereby define a lower annular conduit 39 and an upper annular conduit 40. The lower connection socket 22' and the upper connection socket 23' are welded thereto. The tube plates 13' and 14' have a corresponding larger diameter. In this embodiment, the expansion compensator 12, according to FIGS. 2 and 5, can be omitted, because the thermal expansions are absorbed by the S-shaped portion of the jacket acting as a compensator. The cylindrical part of the jacket 11' between the S-shaped annular widenings may be extended upwards and downwards, toward the tube plates 13' and 14', as shown in FIG. 3. Thereby, an overflow is formed in the upper part of jacket 11' and a nozzle-shaped narrowing of the passage area is formed in the lower part. Consequently, a more uniform distribution of the fused salt supply is obtained. This uniformity may in addition be increased by providing teeth 50 or cut-outs on the periphery of the middle extended portion of jacket 11', in face of the tube plates 13' and 14'.

Figure 4:
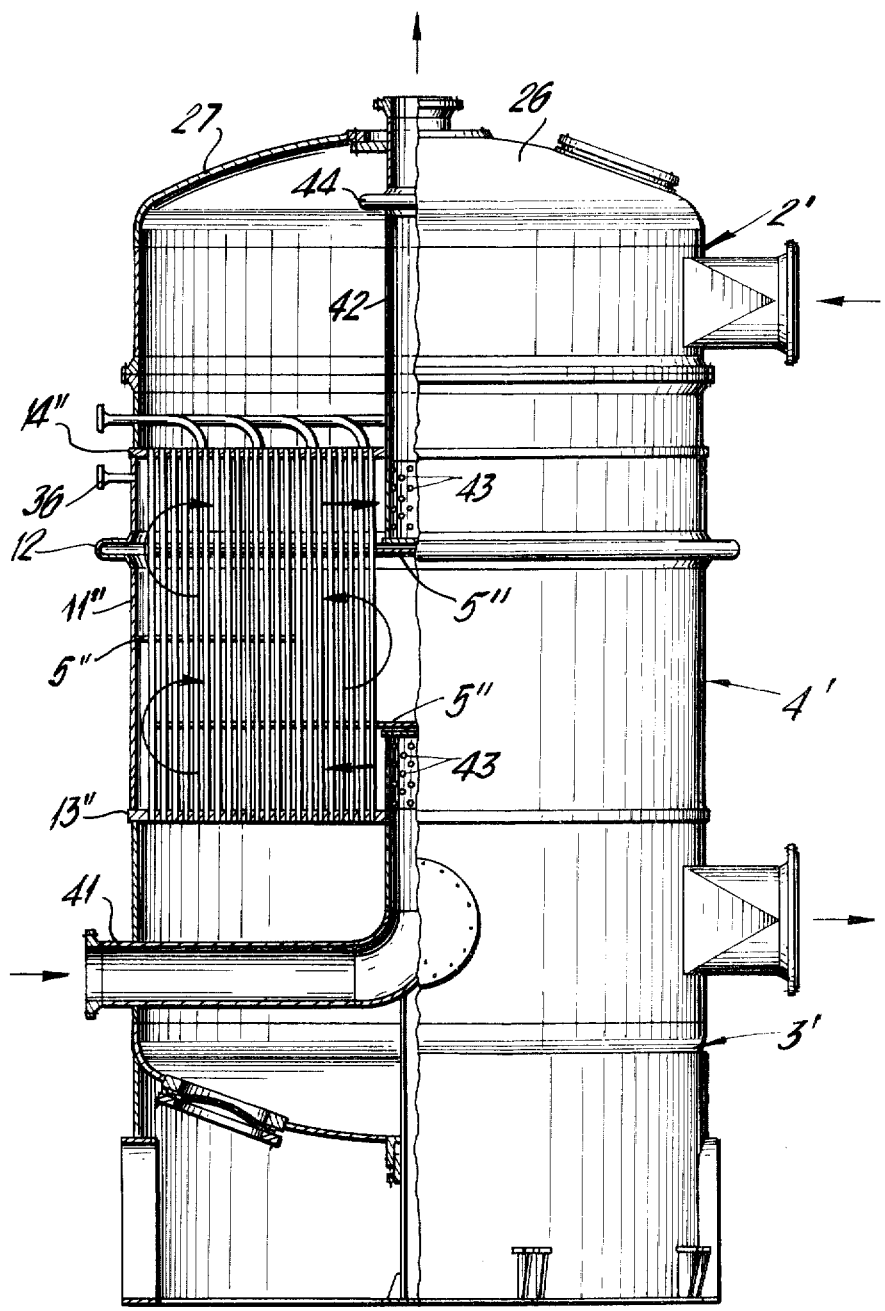
FIG. 4 is a view similar to FIG. 2 of another embodiment of the invention.

FIG. 4 represents a further embodiment in which the fused salt is supplied through a pipe 41 extending across the gas outlet chamber 3', and is centrically welded into the lower tube plate 13''. The coolant is removed through a pipe 42 extending across the gas inlet chamber 2' and centrically welded into the upper tube plate 14''. In contrast to the reaction vessel shown in FIGS. 2 and 5, the U-sections 20 and 21, with the connection sockets 22 and 23, are omitted here. The supply pipe 41 and the outflow pipe 42 are introduced into the tubing unit 4' and extend through the tube plates 13'' and 14'' protruding up to the respective first annular baffle 5'' where they are closed. In the zone between the tube plates 13'', and 14'' and the previously mentioned disc-shaped baffles 5'', pipes 41 and 42 are provided with openings 43 distributed over the pipe circumference. Outlet pipe 42 extends vertically upwards and is screwed to the vaulted top 27 of the gas inlet chamber 2 by means of flanges. An expansion compensator 44, provided in the pipe 42, compensates the thermal expansion differences with respect to the parts rigidly connected to the pipe. The connection piece 36, which can be closed, serves to supply inert gas and is welded to jacket 11'' close below the upper tube plate 14''.

The absence of a central stirrer with a salt bath cooler, the optimal utilization of the given volume, and the construction which is very simple, and therefore, little susceptible to trouble, make it possible, when applying the principles described above, to build reactors of such large dimensions which up to date could not be manufactured. In case the contact tubes are relatively short, for example 2000 mm, as for gas phase reactions with a great space velocity, the large reactors may be transported in vertical position on flat-bed trailers. When reactors with a longer residence time are concerned, where longer contact tubes are needed, for example, up to 4000 mm or more, the transportation problem may be solved so that the reaction part is assembled of two tubing units 4 and 4', which are separately transported to the mounting place. Such a reaction part is represented in FIG. 5. The tubing units 4 and 4' are the same as in FIG. 2. The tubing units 4, the gas inlet chamber 2 and the gas outlet chamber 3 are separately transported to the site. There, the two tubing units 4 are mounted one on top of the other and each closed by the gas inlet or outlet chamber 2 and 3. A heat resisting sealing is provided between the two tubing units. The heat of reaction is eliminated and the fused salt is circulated for both of the tubing units 4 and 4' separately, in the manner described in connection with FIGS. 2 and 3. This arrangement is also advantageous in that the two tubing units 4 of the assembled reactive vessel 1 may be operated with a different temperature drop and that, for example, the intermediate space between the upper and the lower tubing unit may be used as an additional cooling zone with an inert agent. If necessary, the reaction part may also be assembled of more than two tubing units 4.

While specific embodiments of the invention have been shown and described in detail to illustrate the application of the principles of the invention, it will be understood that the invention may be embodied otherwise without departing from such principles.

What is claimed is:

1. A reactor for carrying out catalytic reactions with solid bed catalysts, comprising a reaction vessel and a cooler, said cooler having a separate controllable cooling medium bath, and a coil in the bath for reaction vessel fused salt coolant, the reaction vessel comprising a reaction part including spaced substantially parallel tube plates, a plurality of parallel contact tubes adapted to contain a catalyst mounted between and seated in said tube plates, means defining a gas inlet chamber and a gas outlet chamber on the respective outer sides of said tube plates in communication with the interiors of said contact tubes, said cooler comprising a drum body with a water space and a steam space and having at least one fused salt cooling tube extending through said water space, piping interconnecting said reaction vessel and said coil of said cooler permitting separation of said vessels from each other, said reaction vessel having at least one tubing unit with an inlet and an outlet, said piping including a distributor conduit connected to a respective inlet and outlet each having passages for the heat exchange fluid extending around the periphery of and in contact with said vessel and into said reaction vessel transversely to said tubes, baffle and wall means around and between said tubes permitting back and forth flow of coolant over the exteriors of and transverse to the axes of said tubes from said inlet to said outlet and means for circulating a fused salt coolant between said reaction vessel and said cooler coil, said tube unit including an exterior cylindrical wall extending between and connected to said tube sheets at the respective ends thereof, each end of said cylindrical wall being offset outwardly to define an annular coolant flow space comprising said inlet and said outlet respectively, and including a plurality of upstanding teeth extending around the continuation of the cylindrical wall within the outwardly extending portions forming the annular flow space and arranged in spaced circumferential relationship to define separating teeth at the inlet and outlet, said inlet said inlet comprising a tubular member extending through said gas inlet chamber and through one tube sheet up to said baffle, and being provided with an inner closed end with axially extending openings on the sides thereof for the transverse flow of coolant therethrough, said outlet comprising a tube extending through said outlet gas chamber and through the adjacent tube sheet and also terminating in a closed end with a side wall having perforations therein for the lateral flow of gases therethrough, a connection piece extending into said tube unit which may be closed in order to be able to rapidly discharge the heat exchange fluid by means of an inert gas under pressure connected to said connection piece, said cooler including means for supplying bath water to the coolant and regulating means in said supply means connected to said coolant piping for regulating the supply of bath water to the cooler.

* * * * *